Nov. 18, 1969  W. J. SHIMANCKAS  3,478,620
MARINE PROPULSION UNIT WITH DUAL DRIVE SHAFTS AND
DUAL PROPELLER SHAFTS
Filed Oct. 6, 1967
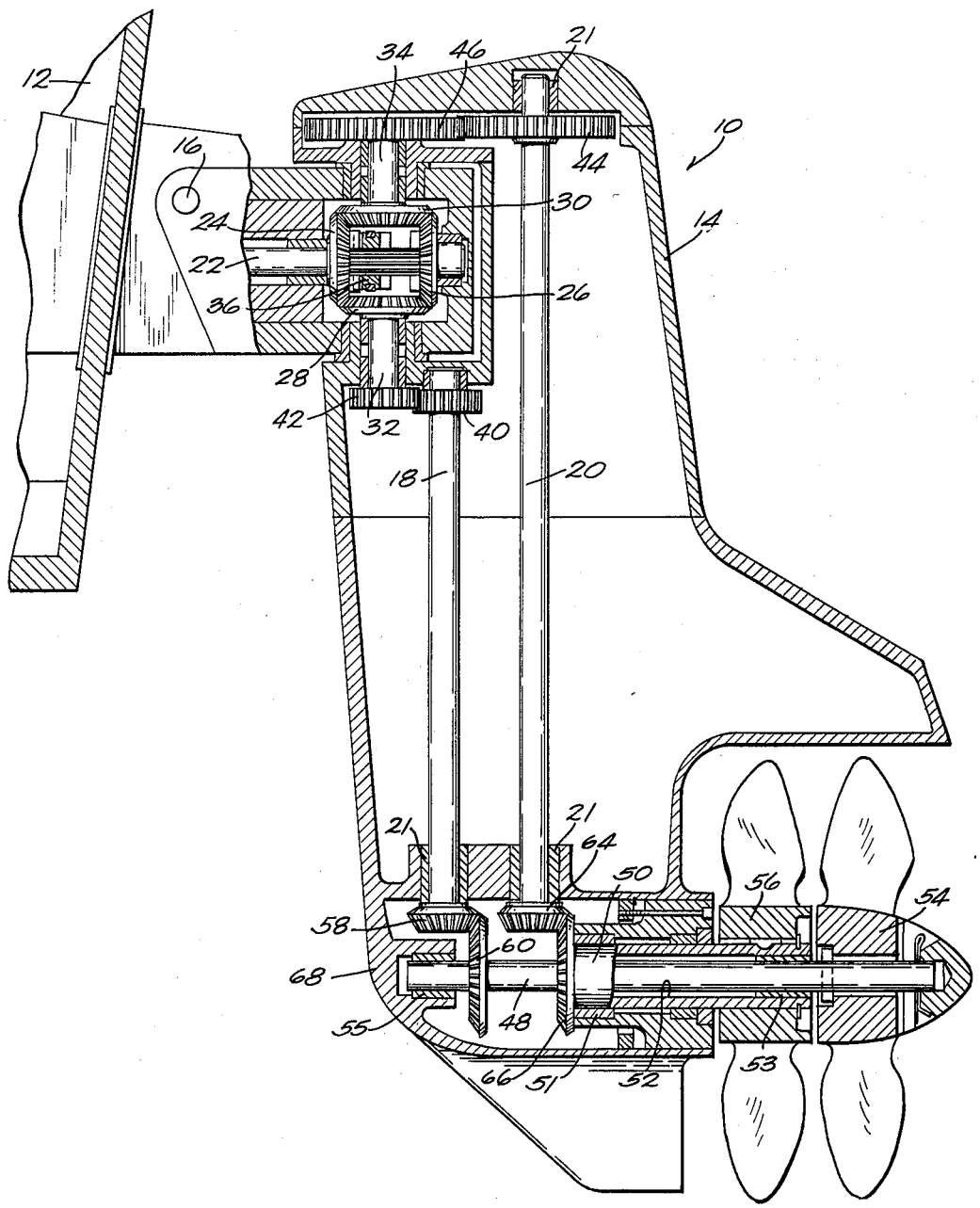
Inventor
William J. Shimanckas
By
Whule, Whule, House & Clemency.
Attorneys

United States Patent Office 3,478,620
Patented Nov. 18, 1969

3,478,620
MARINE PROPULSION UNIT WITH DUAL DRIVE SHAFTS AND DUAL PROPELLER SHAFTS
William J. Shimanckas, Waukegan, Ill., assignor to Outboard Marine Corporation, Waukegan, Ill., a corporation of Delaware
Filed Oct. 6, 1967, Ser. No. 673,357
Int. Cl. F16h *1/22, 37/06*
U.S. Cl. 74—665
8 Claims

ABSTRACT OF THE DISCLOSURE

A stern drive marine propulsion unit which includes two counterrotating drive shafts rotatably supported in a drive shaft housing with each drive shaft drivingly connected to separate co-axial propeller shafts, each shaft carrying a separate propeller.

BACKGROUND OF THE INVENTION

In the present state of the art in stern drive marine propulsion units, the steering axis of the drive unit can either be located on the drive shaft center line or through the universal joint connecting the propulsion unit to the boat hull. There are many advantages in having the steering axis on the drive shaft center line, such as facilitating an effective seal for the tilt joint, greater steering range and elimination of the universal joint. This arrangement has disadvantages in that the engine torque reaction affects steering. One of the techniques used to compensate for the engine torque reaction is to employ a trim tab. However, trim tabs only balance torque for the particular speed for which the trim tab is set.

Patent No. 3,148,557 discloses an outboard motor with counterrotating drive shafts utilized to balance torque reaction.

SUMMARY OF THE INVENTION

The invention contemplates the balancing of engine torque reaction by the use of dual, counterrotating drive shafts supported within a stern drive propulsion unit and dual counterrotating co-axial propeller shafts with one of the propeller shafts projecting through and rotatably supported in the hollow interior of the outer shaft. Use of dual drive shafts and propeller shafts permits the use of smaller gears and thus the reduction of the frontal area of the gear case.

Further objects and advantages of the invention will become apparent from the following drawing and accompanying description.

DRAWING

The figure is a vertical sectional view of one embodiment of a stern drive marine propulsion unit embodying the invention.

DETAILED DESCRIPTION

Referring to the figure, there is shown a stern drive marine propulsion unit which is generally designated 10 and which is dirigibly supported on a boat hull 12. The stern drive unit includes a drive shaft housing 14 which can be tilted about a horizontal axis 16.

The invention contemplates the balancing of torque reaction and thus elimination of torque compensating devices, such as trim tabs, to minimize the effect of engine torque reaction on steering. Torque reaction is balanced by the use of dual drive shafts 18 and 20 which are rotatably supported in housing 14 by bearings 21 located at each end of the shafts 18, 20. Power is supplied from an engine (not shown) loctaed in the boat hull to the drive shafts 18 and 20 by an input shaft 22 rotatably supported in the housing 14.

Means are provided for connecting the drive shafts 18 and 20 to the input shaft 22 so as to divide the engine power equally and counterrotate the drive shafts 18 and 20. In the disclosed construction such means includes opposed bevel gears 24 and 26 which are rotatably carried by input shaft 22 and which are in engagement with opposed bevel gears 28 and 30 secured to respective stub shafts 32 and 34. The shafts 32 and 34 are co-axially aligned and, in the disclosed construction, also function as the steering axis. Such means also includes means for reversing the direction of rotation of the drive shafts which in the disclosed construction includes a clutch dog 36 which is splined to and selectively axially shiftable on shaft 22 to connect shaft 22 to either the bevel gear 24 for forward movement of the hull or to the bevel gear 26 for reverse movement of the hull. The drive shaft 18 is connected to stub shaft 32 by gear 40 which is secured to shaft 18 and which meshes with a gear 42 secured to shaft 32. The drive shaft 20 is connected to the stub shaft 34 by a gear 44 secured to shaft 20 and a gear 46 which is secured to shaft 34 and which meshes with gear 44.

Balancing of torque reaction is also accomplished by the use of dual co-axial propeller shafts 48 and 50. Shaft 50 is rotatably supported in the housing 14 by a bearing 51. The shaft 48 extends through and is rotatably supported in the hollow interior 52 of the propeller shaft 50 by a bearing 53 and is supported at its forward end by a bearing 55 located in the housing 14. A propeller hub 54 is connected to the shaft 48 and the propeller hub 56 is connected to shaft 50.

Means are provided for drivingly connecting the drive shafts 18 and 20 to the propeller shafts 48 and 50. In the disclosed construction such means are in the form of a bevel gear 58 secured to the drive shaft 18 which meshes with a bevel gear 60 secured to propeller shaft 48, and a bevel gear 64 secured to a drive shaft 20 which meshes with a bevel gear 66 secured to the propeller shaft 50.

Inasmuch as the drive shafts 16 and 18 are counterrotating, the use of the gearing arrangement of the disclosed construction will counterrotate the propellers. The propellers can be caused to rotate in the same direction if gear 66 is located forwardly of the gear 64.

The use of dual pinion gears 58, 60 and 64, 66 affords the use of smaller gears and thus less frontal area for the gear case 68. The use of two propellers also affords a hydrodynamic advantage in increasing the thrust capacity over that of a single propeller.

Various of the features of the invention are set forth in the following claims.

I claim:
1. A marine propulsion unit including a housing, an input shaft rotatably supported in said housing, first and second drive shafts rotatably supported in said housing, a first propeller shaft having a hollow interior and rotatably supported in said housing, a second propeller shaft, means for rotatably supporting said second propeller shaft within said interior of said first shaft, means for connecting said first and second drive shafts to said input shaft to counter-rotate said first and second drive shafts, and means drivingly connecting said first and second drive shafts to said first and second propeller shafts.

2. A marine propulsion unit including a housing, an input shaft rotatably supported in said housing, first and second drive shafts rotatably supported in said housing, a first propeller shaft having a hollow interior and rotatably supported in said housing, a second propeller shaft, means for rotatably supporting said second propeller shaft within said interior of said first shaft, a pair of gears rotatably carried by said input shaft, upper and lower co-axial stub shafts transverse to said input shaft, separate gears secured to each of said stub shafts, and located in engagement with said gears on said input shaft, gears on said first and second drive shafts, and gears on said stub shafts in engagement with said gears on said drive shafts.

3. A marine propulsion device in accordance with claim 2 wherein said means for connecting said first and second drive shafts to said input shaft includes means for reversing the direction of rotation of said first and second drive shafts.

4. A marine propulsion device in accordance with claim 3 wherein said means for reversing the direction of rotation of said first and second drive shafts comprises a clutch dog splined to and axially shiftable on said input shaft for selective engagement with either of said gears on said input shaft.

5. A marine propulsion unit including first and second drive shafts, an input shaft, a pair of gears rotatably carried by said input shaft, upper and lower co-axial stub shafts transverse to said input shaft, separate gears secured to each of said stub shafts and located in engagement with said gears on said input shaft, gears on said first and second drive shafts, and other separate gears secured to each of said stub shafts, said other separate gears being in engagement with said gears on said drive shafts.

6. A marine propulsion unit in accordance with claim 5, wherein said drive shafts are counter-rotating.

7. A marine propulsion unit in accordance with claim 5, including an axially shiftable clutch dog secured to said input shaft, said clutch dog being selectively engageable with either of said gears on said input shaft to reverse the direction of rotation of said drive shafts.

8. A marine propulsion unit including a housing, an input shaft rotatably supported in said housing, first and second drive shafts rotatably supported in said housing, a first propeller shaft having a hollow interior and rotatably supported in said housing, a second propeller shaft, means for rotatably supporting said second propeller shaft within said interior of said first shaft, means for connecting said first and second drive shafts to said input shaft to counter-rotate said first and second drive shafts, said means for connecting said first and second drive shafts to said input shaft also including means for reversing the direction of rotation of said drive shafts and means drivingly connecting said first and second drive shafts to said first and second propeller shafts.

References Cited
UNITED STATES PATENTS

| | | | |
|---|---|---|---|
| 2,347,906 | 5/1944 | Hatcher. | |
| 2,518,841 | 8/1950 | Vincent. | |
| 2,989,022 | 6/1961 | Lundquist | 115—37 |
| 3,111,111 | 11/1963 | Willis | 115—34 |

LEONARD H. GERIN, Primary Examiner

U.S. Cl. X.R.

74—417; 115—34, 37